G. P. WALLSTROM.
TRUCK.
APPLICATION FILED JUNE 27, 1921.
1,425,727.
Patented Aug. 15, 1922.
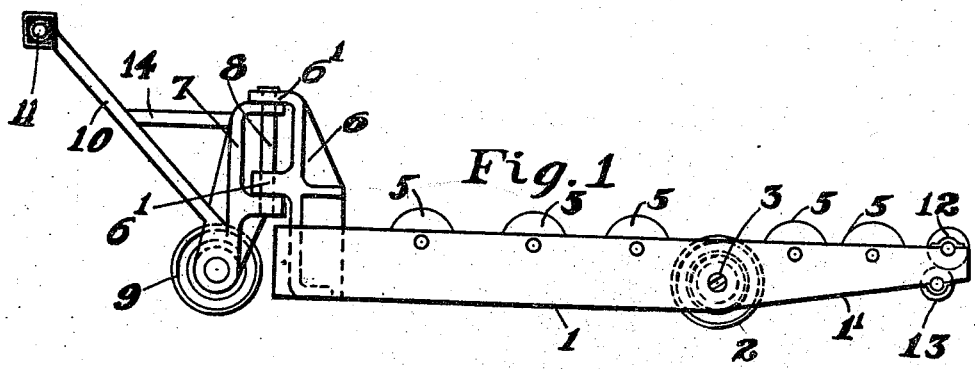
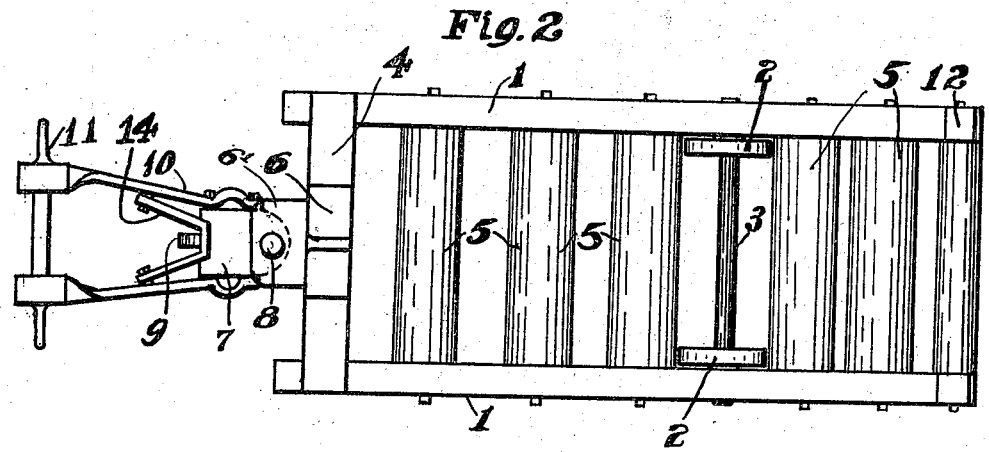
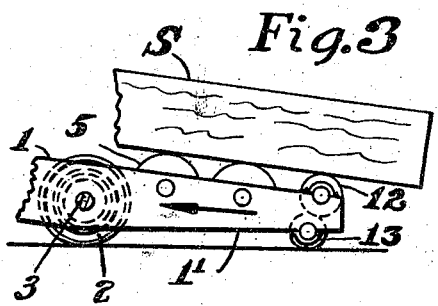
Inventor
Geo. P. Wallstrom
By Ellis Spear Jr.
Attorney

UNITED STATES PATENT OFFICE.

GEORGE PETER WALLSTROM, OF MONTPELIER, VERMONT, ASSIGNOR TO LANE MANUFACTURING COMPANY, OF MONTPELIER, VERMONT, A CORPORATION OF VERMONT.

TRUCK.

1,425,727.  Specification of Letters Patent.  Patented Aug. 15, 1922.

Application filed June 27, 1921. Serial No. 480,522.

*To all whom it may concern:*

Be it known that I, GEORGE P. WALLSTROM, a citizen of the United States, residing at Montpelier, county of Washington, State of Vermont, have invented certain new and useful Improvements in Trucks, of which the following is a specification.

This invention relates to trucks and particularly to a truck for shifting heavy articles, such as stone blocks and slabs. In order to make more clear the construction and operation of my present invention, I will show and describe herein a form of truck especially adapted for handling stone as it illustrates both the general principles of my present invention and at the same time shows a useful specific embodiment.

The substantial problem involved in handling heavy objects, like blocks of stone, lies in the difficulty of delivering them from the truck in certain positions where it is inconvenient, if not impossible, or if possible, extremely hazardous for workmen to stand or to apply human force.

For example, in the loading of freight cars with blocks or slabs or monumental pieces, it is necessary to place these heavy articles in corners of the car or in close proximity to each other. Heretofore it has been necessary to truck the stone in the car, remove it from the truck and then by skids or rollers and levers work it to the desired spot to which it is to be transported.

This has been difficult and dangerous. The object of my present invention is to provide for such work a safe and convenient truck by which a heavy object may be taken to the spot desired and there deposited without the use of extra rollers or in fact without subsequent shifting of its position.

I have shown in the accompanying drawings a construction of truck which I have found adapted in practical use.

Throughout the specification and drawings like reference characters are employed to indicate corresponding parts, and in the drawings:

Fig. 1 is a side elevation of a truck in accordance with my invention.

Fig. 2 is a plan view of the same, and

Fig. 3 is a fragmentary detail showing a depositing of a slab.

My truck consists of suitable side members or frame pieces 1 which are tapered at their rear ends as at 1' to give a slight upward inclination or clearance. The truck is provided between its ends and in specific form showing somewhat to the rear of its center of gravity with a pair of low wheels on an axle 3. The side members 1 are joined by a front cross frame member 4 and the axle 3 and also spaced by the rollers 5. The rollers 5 are set between the side members 1 and project slightly above the upper level of the frame and are adapted to receive and support the load while being transported. The forward cross piece 4 is provided with a casting 6 having bearing members 6' to which a truck member 7 is swiveled by a pin 8.

The truck member 7 is provided with a wheel 9 and suitable handles 10 with cross handle 11 for conveniently moving and guiding the truck.

At the extreme rear end of the truck is a smaller roller 12 which is raised so as to come substantially on the level of the tops of the rolls 5. This roll 12 has a frictional contact with the roll 13 which is extended below the lower surface of the inclined portion 1'. When the truck is loaded, a slab or block S is placed well forward so that the weight is fairly distributed between the wheels 2 and 9. The truck may then be backed up to the desired position as for example in the corner of a freight car.

The stone S shown in Fig. 3 may then be safely shifted by raising handles 11, so as to overweight the rear end of the truck, raising the wheel 9 clear of the floor and bringing the roll 13 at the rear end down on the floor. The stone S now bears on the roll 12 and any movement of the stone by gravity rotates the roll 12 and also the roll 13 so that the roll 13 feeds the truck out from under the stone as indicated by arrow in Fig. 3.

The stone is therefore dropped or deposited in substantially the spot desired, and all without danger to workmen and without the necessity of having workmen close to the stone or of placing skids or rollers under or removing them from under the block when in place.

My invention is capable of various embodiment and trucks in accordance with my invention may be variously designed for different classes of work. All such modifications are therefore to be considered within the spirit of my invention if within the limits of the appended claims.

What I therefore claim and desire to secure by Letters Patent is:

1. In a tilting truck of the class described, a wheeled support between its ends, a rotatable delivery device at the rear of the truck and exposed above the upper surface of the same, and a rotatable driver in frictional contact with said delivery device and exposed below said truck in normal elevation above the floor, said truck being tiltable on its said wheel support to bring said driver into contact with the floor.

2. In a tilting truck of the class described, a wheeled guide at its forward end, a pair of wheels between its ends, a rotatable delivery guide at the rear of the truck and exposed above the upper surface of the same, and a rotatable driver in frictional contact with said delivery device and exposed below said truck in normal elevation above the floor, said truck being tiltable on its said supporting wheels to bring said driver into contact with the floor.

3. In a tilting truck of the class described, a frame wheeled at one end and adjacent the center, a roller system on the frame and exposed above the level of it, including a roller at the rear end of the truck and a rotatable driver in frictional contact with said rear roller and exposed below said frame in normal elevation above the floor.

4. In a truck of the class described, a frame wheeled at one end and adjacent the center, a roller system on the frame and exposed above the level of it, including a roller at the rear of the truck and a driving roller frictionally engaging with said rear roller and exposed below said frame in normal elevation above the floor.

5. In a truck of the class described, a frame upwardly inclined to the rear on its underside, a guide wheel at its forward end, a pair of supporting wheels between its ends and to the rear of its center of gravity, a roller system on the frame and exposed above the top thereof, including a roller at the rear end of the truck and a rotatable driver operatively associated with said rear roller and exposed below said frame in normal elevation above the floor, but contacting the floor when said truck is tilted on its said supporting wheels.

6. In a truck of the class described, a frame upwardly inclined to the rear on its underside, a swivel guide wheel at its forward end, a pair of supporting wheels between its ends and to the rear of its center of gravity, a roller system on the frame and exposed above the top thereof, including a roller at the rear end of the truck and a rotatable driver operatively associated with said rear roller and exposed below said frame in normal elevation above the floor, but contacting the floor when said truck is tilted on its said supporting wheels.

7. A truck comprising a wheeled frame having an anti friction load support, and having a rotatable driver exposed below said frame in normal elevation above the ground and adapted to contact the ground when the truck is tilted, and a rotatable delivery device in frictional contact with said driver and onto which the load gravitates when the truck is tilted, whereby to revolve said delivery device and through the frictional contact thereof with the driver to revolve said driver in a direction effective to automatically slide the truck from beneath the load.

8. A truck comprising a frame having a swiveled guide wheel at its forward end and a pair of ground wheels beneath its ends and having on its upper side a plurality of revoluble load supporting devices, a rotatable driver at the rear end of said frame and exposed below said frame in normal elevation above the ground and adapted to contact the ground when the truck is tilted and a rotatable delivery device in frictional contact with said driver and onto which the load gravitates when the truck is tilted and whereby to revolve said delivery device and through the frictional contact thereof with the driver to revolve said driver in a direction effective to automatically slide the truck from beneath the load.

In testimony whereof I affix my signature in presence of two witnesses.

GEORGE PETER WALLSTROM.

Witnesses:
R. R. PIERCE,
H. T. FRENIER.